United States Patent [19]

Smith

[11] 4,011,889

[45] Mar. 15, 1977

[54] PISTON VALVE
[75] Inventor: Robert Lewis Smith, Louisville, Ky.
[73] Assignee: Chemetron Corporation, Chicago, Ill.
[22] Filed: Dec. 11, 1975
[21] Appl. No.: 639,746
[52] U.S. Cl. .................. 137/614.11; 137/614.18; 137/630.19
[51] Int. Cl.² ................ F16K 1/00; F16K 3/24
[58] Field of Search ............... 137/614.11, 614.18, 137/241, 630.19

[56] References Cited
UNITED STATES PATENTS

| 1,047,774 | 12/1912 | Eynon | 137/614.18 |
| 1,370,760 | 3/1921 | Ostrander | 137/614.11 |
| 3,125,121 | 3/1964 | Muller | 137/614.18 X |
| 3,895,651 | 7/1975 | Okada et al. | 137/614.11 X |

FOREIGN PATENTS OR APPLICATIONS 1,012,134  7/1957  Germany ..................... 137/614.11

Primary Examiner—Alan Cohan
Assistant Examiner—Gerald A. Michalsky
Attorney, Agent, or Firm—N. M. Esser

[57] ABSTRACT

A valve having separate closures for its inlet and its outlet respectively comprises a housing having the inlet in an elongated tubular wall and the outlet at an annular valve seat. A piston constituting one closure is movable coaxially within said wall so as to open and close the outlet. A sleeve constituting another closure is movable coaxially over the piston and within said wall so as to open and close the inlet. The piston and the sleeve are associated for interdependent movement.

5 Claims, 1 Drawing Figure

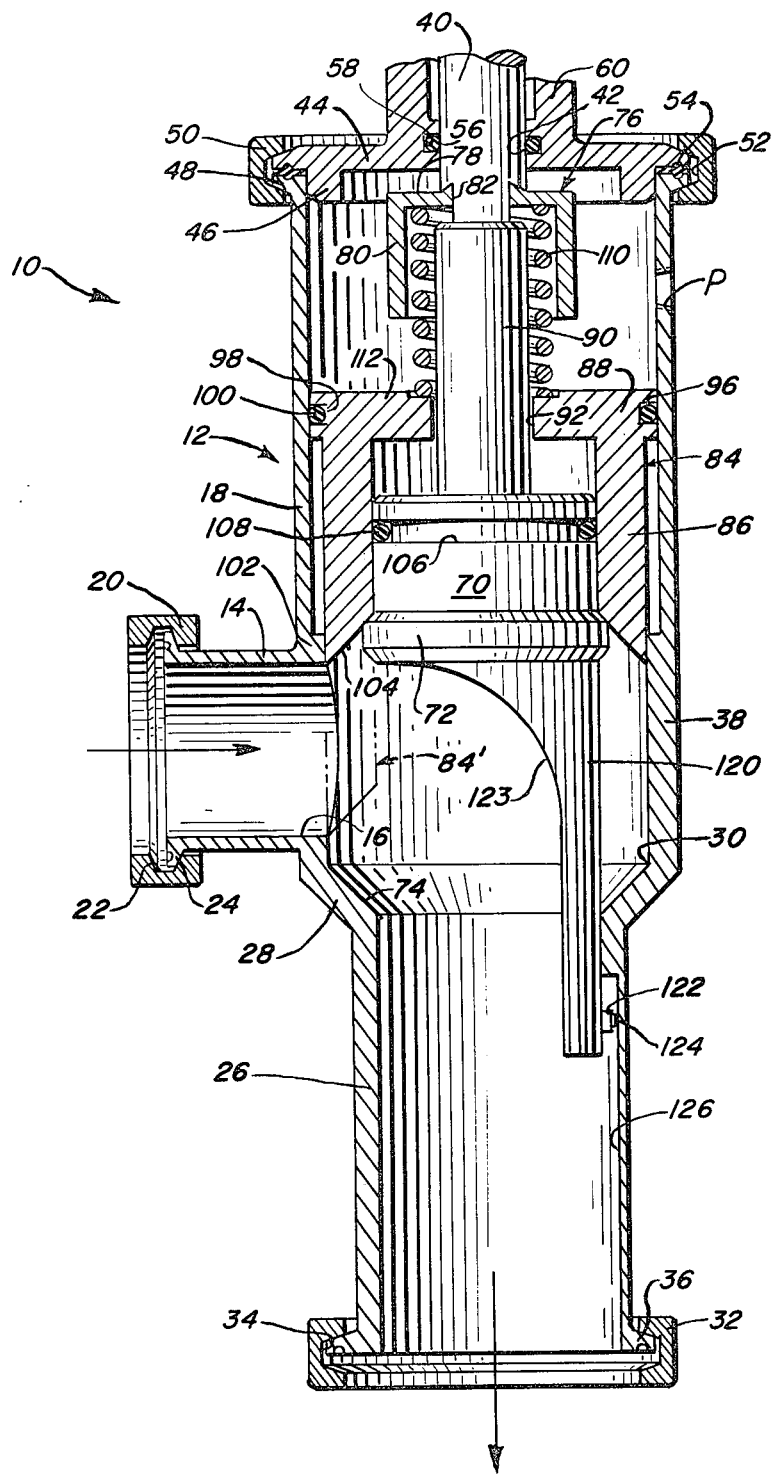

even though the outlet 30 is closed by the piston 70.

PISTON VALVE

BACKGROUND OF THE INVENTION

This invention pertains to a valve having separate closures for an inlet and an outlet respectively. The valve has particular utility in food-handling systems and other systems wherein fluent materials may contain particulate matter.

In food-handling systems, as an example, particulate matter may block internal apertures and thus prevent complete closure of ball valves, gate valves, butterfly valves, spool valves, and other single-closure valves. Because of resultant leakage, such valves have limited utility as control valves for volumetric filling and similar applications.

Repeated cycling often is used, as an expedient to clear such incompletely closed valves, particularly when aseptic conditions and other conditions of continuous operation do not allow the valves to be opened for manual removal of blockage. Subjected thereby to rough handling, meat chunks, vegetable pieces, macaroni bits, and other types of delicate particulates tend to be masticated and otherwise physically damaged beyond tolerable limits.

A need thus has existed for a new and improved valve for fluent materials, which may contain particulate matter, as discussed above. This invention is addressed to such need.

SUMMARY OF THE INVENTION

Therefore, one object of this invention is to provide a new and improved valve for fluent materials, which may contain particulate matter, as discussed above. A more particular object of this invention is to provide a valve having particular utility in food-handling systems to minimize fluid leakage caused by particulate matter blocking internal apertures of the valve and to allow such apertures to be cleared without manual removal of any blockage yet with minimal damage to delicate particulates.

These objects may be attained in a valve having separate closures for its inlet and its outlet respectively and more particularly comprising a housing having the inlet in an elongated tubular wall and the outlet at an annular valve seat. A piston constituting one closure is movable coaxially with said wall so as to open and close the outlet. A sleeve constituting another closure is movable coaxially over the piston and within said wall so as to open and close the inlet. The piston and the sleeve are associated for interdependent movement whereby the piston is adapted close to the outlet even though the sleeve may be blocked by particulate matter at the inlet and whereby both the inlet and the outlet are fully opened when the piston is retracted such that the outlet is fully opened.

These objects and other objects, features, and advantages of this invention are evident from the following detailed description of a preferred embodiment of this invention with the aid of the accompanying drawing.

BRIEF DESCRIPTION OF THE DRAWING

In the drawing, the sole unnumbered FIGURE is an axial sectional view of a valve constituting a presently preferred embodiment of this invention.

DETAILED DESCRIPTION OF PREFERRED EMBODIMENT

The drawing illustrates, in a convenient but not critical vertical orientation, a valve 10 constituting a presently preferred embodiment of this invention. The valve 10 has particular utility in an aseptic canning system for food products containing delicate particulates.

The valve 10 comprises a generally tubular housing 12. A tubular inlet portion 14 of the housing 12 opens into an inlet 16 in the elongated tubular wall 18 of the housing 12 and may be connected to inlet piping (not shown) by a conventional ring clamp 20 provided with a groove 22 engaging a suitably flared end 24 of the tubular inlet portion 14, a conventional interposed gasket (now shown), and a similarly flared end of said piping. A tubular outlet portion 26 extends coaxially from an annular valve seat 28 forming an outlet 30 in the housing 12 may be connected to outlet piping (not shown) by a similar ring clamp 32 provided with a groove 34 engaging a similarly flared end 36 of the tubular outlet portion 26 etc. As shown, the inlet 16 is located in a lower wall portion 38 having a relatively smaller inner diameter and thus greater thickness as compared to other positions of the wall.

A rod 40 (shown fragmentarily) extends with a conventional sliding fit through an opening 42 in an annular end wall 44, which is provided with an annular coaxial flange 46 precisely locating the wall 44 within one end 48 of the elongated tubular wall 18. The wall 44 is connected to the wall 18 by another conventional ring clamp 50 provided with a groove 52 engaging said end 48, which is suitably flared, and also a conventional interposed gasket 54 and the wall 44. A conventional anti-friction bearing 56 encircles the rod 40 and rests in a groove 58 within the opening 42. An elongated tubular extension 60 (shown fragmentarily) of the wall 44 encases the rod 40. Suitable motive mechanism (not shown) may be arranged to reciprocate the rod 40 so as to open and close the valve 10 as desired. Suitable mechanisms are well known and form no part of this invention.

A piston 70 constituting a closure for the outlet 30 is connected to the rod 40, integrally as shown, for conjoint movement with the rod 40 coaxially within the wall 18 between a fully extended position wherein a suitably beveled boss 72 on the piston 70 engages a complementarily beveled surface 74 of the annular valve seat 28 to close the outlet 30 and retracted positions (at and above its position in the drawing) wherein the outlet 30 is fully opened. A stop 76, which as shown is provided by the base 78 of an inverted cylindrical cup 80 carried by the rod 40 tightly fitting through an opening 82 located centrally in the base 78 for conjoint movement of the stop 76 with the rod 40 coaxially within the wall 18, is engageable with the wall 44 to define a fully retracted position of the piston 70.

A sleeve 84, which as shown is provided by the elongated cylindrical wall 86 of an inverted cylindrical cup 88, is mounted over the rod 40, a radially enlarged portion 90 of which extends through a somewhat oversized opening 92 located centrally in the base 94 of the cup 88, for coaxial movement of the sleeve 84 over the piston 70 and within the wall 18 between extended positions (at and below its position suggested fragmentarily at 84' in phantom lines in the drawing) wherein the sleeve 84 is disposed across the inlet 16 to close the inlet 16 and retracted position (at and above its position shown in full lines in the drawing) wherein the inlet 16 is fully opened.

An upper circumferential boss 96 on the sleeve 84 has a conventional sliding fit within the wall 18 and is provided with a groove 98, which confines a conventional O-ring 100 engaging the wall 18 to provide a fluid-tight seal and is engageable with a shoulder 102, which is formed by the thicker wall portion 38 of the wall 18, to define a fully extended position of the sleeve 84. A lower edge wall 104 of the sleeve 84 is beveled to engage the piston 70, at its boss 72 which is beveled complementarily, and to allow sufficient clearance for the boss 72 when the piston 70 and the sleeve 84 respectively are in their fully extended positions. The piston 70 is provided with a groove 106 confining a conventional O-ring 108 engaging the sleeve 84 to provide a fluid-tight seal.

A spring 110 is piloted over the rod 40, primarily over its radially enlarged portion 90, between the stop 76 and the base 112 of the cup 88 providing the sleeve 84 toward its fully extended position, insofar as its extension is not limited by the boss 72 on the piston 70, and for practical purposes limits its retraction, which ultimately is limited to a fully retracted position wherein the cup 88 providing the stop 76 upwardly engages the wall 44 and downwardly engages the cup 88 providing the sleeve 84.

A port P in the wall 18 provides a connection through which steam may be introduced to the generally annular space surrounding the spacing above cup 88 so as to maintain a generally aseptic condition in such space. *The port P also may be used to introduce pressurized gas, such as sterile nitrogen, so as both to provide thermal insulation and to maintain a positive pressure differential, which is intended to overcome any tendency for fluid leakage to occur above the cup 88.

*A suitable steam outlet (not shown) is provided for continuous flushing.

A portion 120 of the piston 70 extends downwardly across the inlet 16 and through the outlet 30 and has a surface 123 curved to deflect fluent materials from the inlet 16 through the outlet 30 when the piston is in retracted positions. Upon closing movement of the piston 70, its downwardly extending portion 120 expels any blockage downwardly from the outlet 30 with minimal damage to delicate particulates thus expelled. A roller 122, which is mounted on a pintle 124 extending radially outwardly from the downwardly extending portion 120, rides in an elongated axial groove 126 in the tubular outlet portion 26 of the housing 12. The roller 122 cooperates with the groove 126 to prevent relative rotation of the piston 70 and the housing 12 and consequent disorientation of the surface 123 relative to the inlet 16.

Closing movement of the sleeve 84 is retarded and the spring 100 consequently is compressed if any blockage in the inlet 16 is nudged either countercurrently through the inlet 16 or concurrently through the outlet 30 by conjoint movement of the piston 70. Thus, only those particulates having insufficient substance to compress the spring 110 ordinarily are damaged extensively by closing movement of the sleeve 84.

In most instances, repeated cycling of the valve 10 suffices to clear the inlet 16 of any blockage, which may be sensed by conventional means (not shown) to alert system operators to its necessity and, if desired, to cause the piston 70 to assume and remain in its fully extended position until such blockage has been cleared from the inlet 16. Because any blockage in the inlet 16 ordinarily does not hamper proper closure of the outlet 30 by the piston 70, the valve 10 is readily adaptable to volumetric filling and similar application.

I claim:

1. A valve for fluent materials, which may contain relatively large, unhomogeneous particulate matter, comprising: a housing having an elongated tubular wall having an inlet, a closed end, and an annular valve seat forming an outlet opposite said end a rod extending coaxially within said wall and through said end and being reciprocatable therein, a piston connected to said rod for conjoint movement with said rod coaxially within said wall between a fully extended position wherein said piston engages said seat to close said outlet and a retracted position wherein said outlet is fully opened, said piston also having a portion extending across said inlet and through said outlet and having a surface curved to deflect fluent material from said inlet through said outlet when said piston is in the retracted position, a sleeve mounted around said rod and around said piston for coaxial movement with said piston and within said wall between an extended position wherein said sleeve is disposed across said inlet to close said inlet and a retracted position wherein said inlet is fully opened, and means for biasing said sleeve toward said piston, said means moving said sleeve to resiliently close said inlet as said piston portion surface clears said outlet prior to said piston closing said outlet.

2. The valve of claim 1 in which said inlet is located generally transverse to said tubular wall.

3. The valve of claim 2 further comprising means preventing rotation of said piston and said piston portion to maintain the relationship of said curved surface to said inlet.

4. The valve of claim 3 further comprising sealing means between said sleeve and said tubular wall and sealing means between said piston and said sleeve.

5. The valve of claim 4 further comprising a port in said tubular wall adjacent said closed end and adapted to be connected to a source of pressure to maintain sleeve and piston sealing effectiveness.

* * * * *